(12) United States Patent
Duval et al.

(10) Patent No.: US 11,046,417 B2
(45) Date of Patent: Jun. 29, 2021

(54) VERTICAL STABILIZER

(71) Applicant: Bell Helicopter Textron Inc., Fort Worth, TX (US)

(72) Inventors: Sebastien Duval, Terrebonne (CA); Guillaume Noiseux-Boucher, Mirabel (CA); Aaron Alexander Acee, Flower Mound, TX (US)

(73) Assignee: Textron Innovations Inc., Providence, RI (US)

( * ) Notice: Subject to any disclaimer, the term of this patent is extended or adjusted under 35 U.S.C. 154(b) by 509 days.

(21) Appl. No.: 15/933,106

(22) Filed: Mar. 22, 2018

(65) Prior Publication Data
US 2019/0291848 A1    Sep. 26, 2019

(51) Int. Cl.
*B64C 5/06* (2006.01)
*B64C 27/82* (2006.01)
*B64C 5/12* (2006.01)

(52) U.S. Cl.
CPC .................. *B64C 5/06* (2013.01); *B64C 5/12* (2013.01); *B64C 27/82* (2013.01); *B64C 2027/8263* (2013.01); *B64C 2027/8272* (2013.01)

(58) Field of Classification Search
CPC .... B64C 5/06; B64C 5/12; B64C 5/16; B64C 9/32; B64C 9/326; B64C 2027/8263; B64C 2027/8272
See application file for complete search history.

(56) References Cited

U.S. PATENT DOCUMENTS

| 6,053,452 A * | 4/2000 | Yamakawa | B64C 13/16 244/17.19 |
| 6,543,720 B2 * | 4/2003 | Ladd | B64C 9/00 244/45 R |
| 2014/0374534 A1 * | 12/2014 | McCollough | B64C 27/82 244/17.21 |

* cited by examiner

*Primary Examiner* — Nicholas McFall
(74) *Attorney, Agent, or Firm* — Lightfoot & Alford PLLC

(57) ABSTRACT

Systems and methods include providing an aircraft with a vertical stabilizer system having a vertical stabilizer operatively coupled to a tail boom, tail rotor gearbox, or other component of the aircraft at a forward attachment and an aft attachment. The vertical stabilizer is selectively rotatable to adjust an angle of attack of the vertical stabilizer with respect to a forward flight direction of the aircraft. The vertical stabilizer is rotatable between a forward flight position having a substantially small degree angle of attack and a hover or lateral movement position having a substantially ninety degree angle of attack.

19 Claims, 7 Drawing Sheets

VERTICAL STABILIZER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

In flight, aircraft are subjected to various aerodynamic forces as a result of the design, flight characteristics, and operating parameters of a particular aircraft. Environmental factors also play a role in the aerodynamic forces experienced by an aircraft. Rotorcraft are particularly sensitive to such aerodynamic forces since rotorcraft have not only forward flight capability, but also hover and lateral mobility capability. Thus, the aerodynamic forces on a rotorcraft change depending on the flight operation of the rotorcraft. Accordingly, rotorcraft must be designed to accommodate and respond to the various aerodynamic forces when operated to provide forward flight, hover, and lateral maneuverability.

Rotorcraft typically have a vertical fin or stabilizer rigidly mounted on an aft end of an empennage or tail boom, which provides the rotorcraft a yawing moment when free stream air flows over it. This yawing moment is in addition to the yawing moment provided by the rotorcraft's tail rotor. As the forward flight speed of the rotorcraft increases, the yawing moment provided by the vertical stabilizer also increases, thereby demanding less power from the tail rotor to provide yaw stability. Because of this phenomenon, the vertical stabilizer is extremely beneficial during high speed forward flight of the rotorcraft.

When the rotorcraft is not in high speed forward flight and is operating in hover, lateral maneuvering, or low speed forward flight, the vertical stabilizer surface can be detrimental to the rotorcraft's performance. This is due, at least in part, to the clearance between the vertical stabilizer and the main rotor, which causes the vertical stabilizer to be typically placed within the airflow imparted by the tail rotor. The vertical stabilizer in this situation actually blocks the airflow imparted by the tail rotor, thereby reducing the efficiency of the tail rotor to provide yaw stability. Further, when the rotorcraft is maneuvering laterally, the vertical stabilizer provides a large "flat-plate" drag associated with it, which produces a large yawing moment that needs to be countered by the tail rotor, further impeding the efficiency of the tail rotor system.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
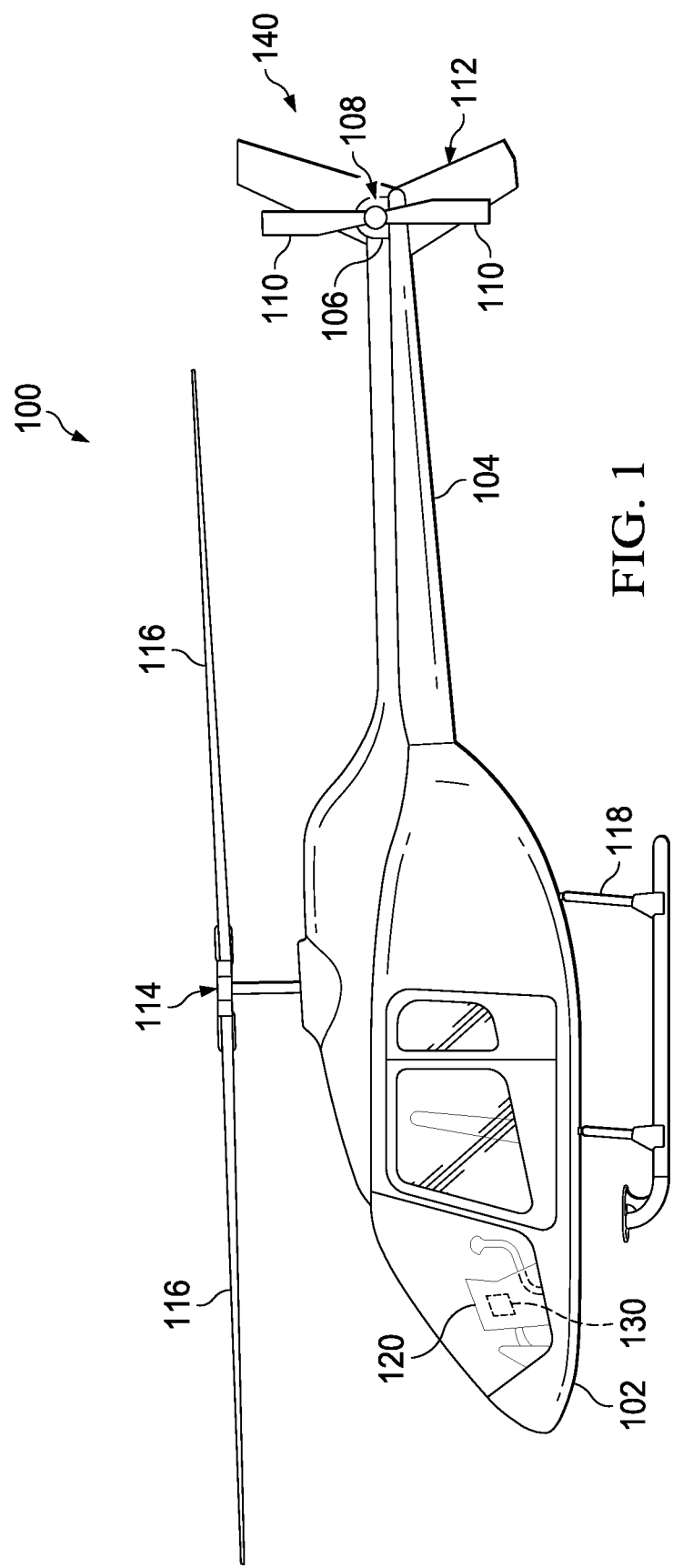
FIG. 1 is a side view of a helicopter according to this disclosure.

Referring to FIG. 1, a side view of a helicopter 100 is shown. Helicopter 100 comprises a fuselage 102 and an empennage or tail boom 104. In the embodiment shown, the tail boom 104 comprises a tail rotor gearbox ("TRGB") 106 disposed on an aft end of the tail boom 104 to which a tail rotor 108 comprising a plurality of tail rotor blades 110 is operatively coupled. However, in other embodiments, helicopter 100 may not comprise a TRGB 106, and instead comprise an electric motor or the like configured to provide rotation to the tail rotor 108. A vertical tail fin or stabilizer 112 is coupled to the aft end of the tail boom 104 and/or the TRGB 106. The vertical stabilizer 112 is a component of a vertical stabilizer system 140 that is selectively adjustable based on the operation of the helicopter 100. Helicopter 100 further comprises a main rotor system 114 having a plurality of main rotor blades 116 that are selectively rotatable to provide lift to the helicopter 100. A landing gear or skid 118 is attached to the fuselage 102 and configured to support the helicopter 100 when the helicopter 100 is grounded. Helicopter 100 also comprises a pilot control system 120 that includes controls for receiving inputs from a pilot or co-pilot to operate the helicopter 100, and a flight control system 130, which may, for example, include hardware and/or software for controlling the helicopter 100 in flight. Still further, while not shown, helicopter 100 also comprises a combustion engine configured to propel the helicopter 100 during forward flight.

Figure 2:
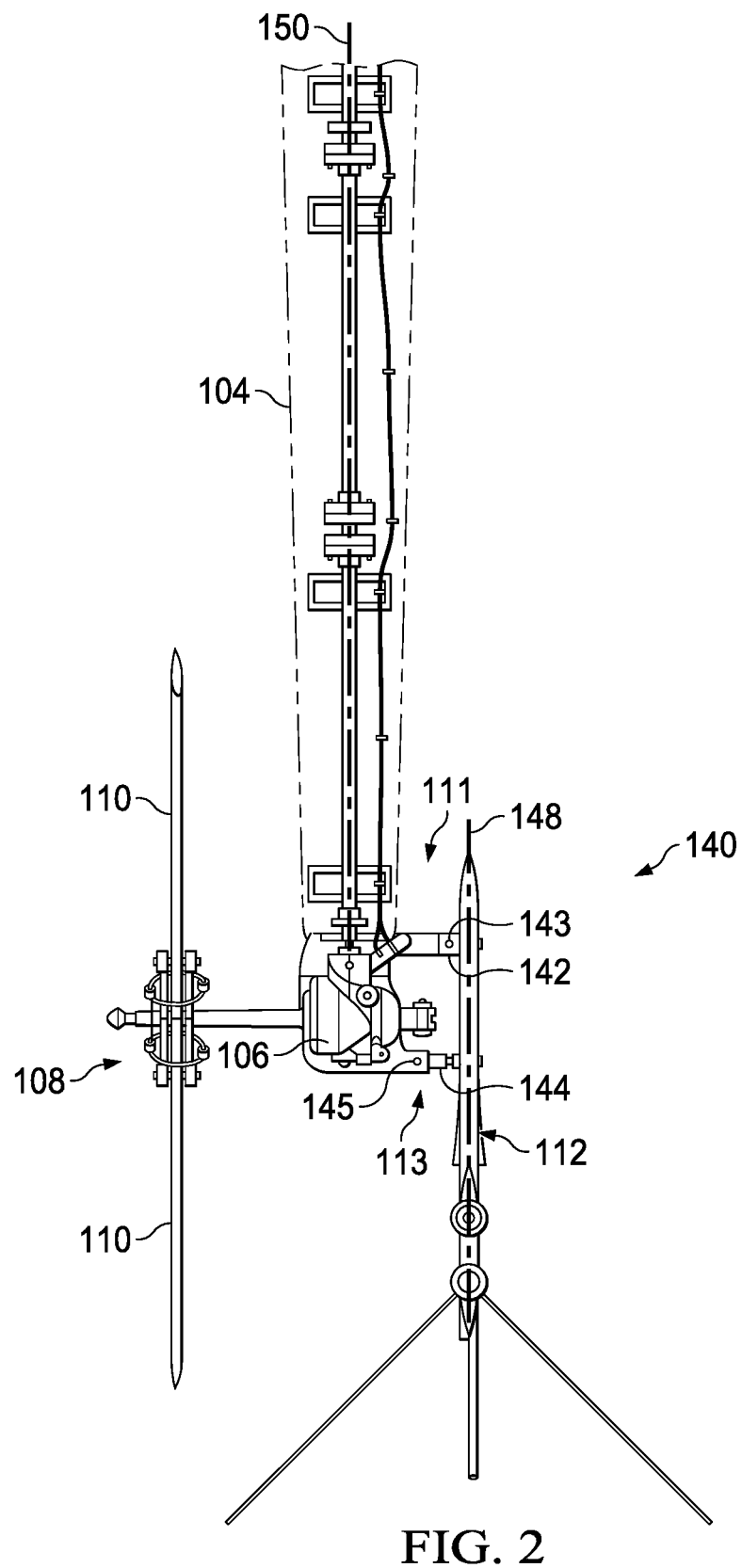
FIG. 2 is a detailed top view of a vertical stabilizer system of the helicopter of FIG. 1 configured in a forward flight position.

Referring to FIG. 2, a detailed top view of the vertical stabilizer system 140 of the helicopter 100 of FIG. 1 is shown configured in a forward flight position. The vertical stabilizer system 140 comprises the vertical stabilizer 112, which comprises a fixed airfoil shape having a longitudinal axis 148. The vertical stabilizer 112 is generally disposed on an opposing side of the tail boom 104 and/or the TRGB 106 relative to the tail rotor 108. However, in some embodiments, the vertical stabilizer 112 may be substantially centered over the tail boom 104 and/or the TRGB 106. The vertical stabilizer 112 is coupled to the tail boom 104 and/or the TRGB 106 via a forward attachment 111 and an aft attachment 113 of the vertical stabilizer system 140. The forward attachment 111 and the aft attachment 113 comprise functional, non-fixed attachments, such that the vertical stabilizer 112 is selectively rotatable with respect to the tail boom 104 and/or the TRGB 106 via the forward attachment 111 and the aft attachment 113.

The forward attachment 111 comprises a selectively pivotable hinge 142 coupling the vertical stabilizer 112 to the tail boom 104 and/or TRGB 106. The hinge 142 comprises a hinge axis 143 about which the hinge 142 can rotate to allow selective rotation of the vertical stabilizer 112 with respect to the tail boom 104 and/or the TRGB 106. At least in some embodiments, the hinge axis 143 is substantially parallel to a yaw axis of the helicopter 100. The aft attachment 113 comprises at least one actuator 144. However, in some embodiments, the aft attachment 113 may comprise a plurality of actuators 144. The actuator 144 is selectively actuated (extendable and retractable) to cause the vertical stabilizer 112 to rotate about the hinge axis 143. The actuator 144 may be selectively actuated electrically, electro-mechanically, hydraulically, pneumatically, and/or mechanically (e.g. worm drive) and be initiated by an input received via the pilot control system 120 and/or automatically actuated via the flight control system 130 based on the operation of helicopter 100. Additionally, the actuator 144 may be pivotable about a pivot axis 145 to allow for articulation of the actuator 144 when the actuator 144 is selectively actuated.

The vertical stabilizer 112 of FIG. 2 is shown in the forward flight position. In the forward flight position, the vertical stabilizer 112 may generally comprise a substantially small degree angle of attack (146 in FIG. 3). In some embodiments, the angle of attack 146 in the forward flight position may be less than or equal to about five degrees. In the embodiment shown, the angle of attack 146 in the forward flight position may be between about four degrees and about five degrees. However, in other embodiments, the angle of attack 146 in the forward flight position may be about zero degrees. It will be appreciated that a zero degree angle of attack 146 occurs when the longitudinal axis 148 of the vertical stabilizer 112 is substantially parallel to a longitudinal axis 150 of the tail boom 104 and/or helicopter 100, which may also be coincident with a roll axis of the helicopter 100 and/or a direction of straight line forward flight of the helicopter 100. Thus, the angle of attack 146 is defined as the angle between the longitudinal axis 148 of the vertical stabilizer 112 and the longitudinal axis 150 of the tail boom 104 and/or helicopter 100. Accordingly, selective actuation of the actuator 144 to rotate the vertical stabilizer 112 about the hinge axis 143 changes the angle of attack 146 of the vertical stabilizer 112. The vertical stabilizer system 140 comprises a failsafe to configure the vertical stabilizer 112 to the forward flight position in order to reduce the power consumption of the tail rotor 108 to control yaw and maximize the performance benefits of the vertical stabilizer 112 during high speed forward flight.

Figure 3:
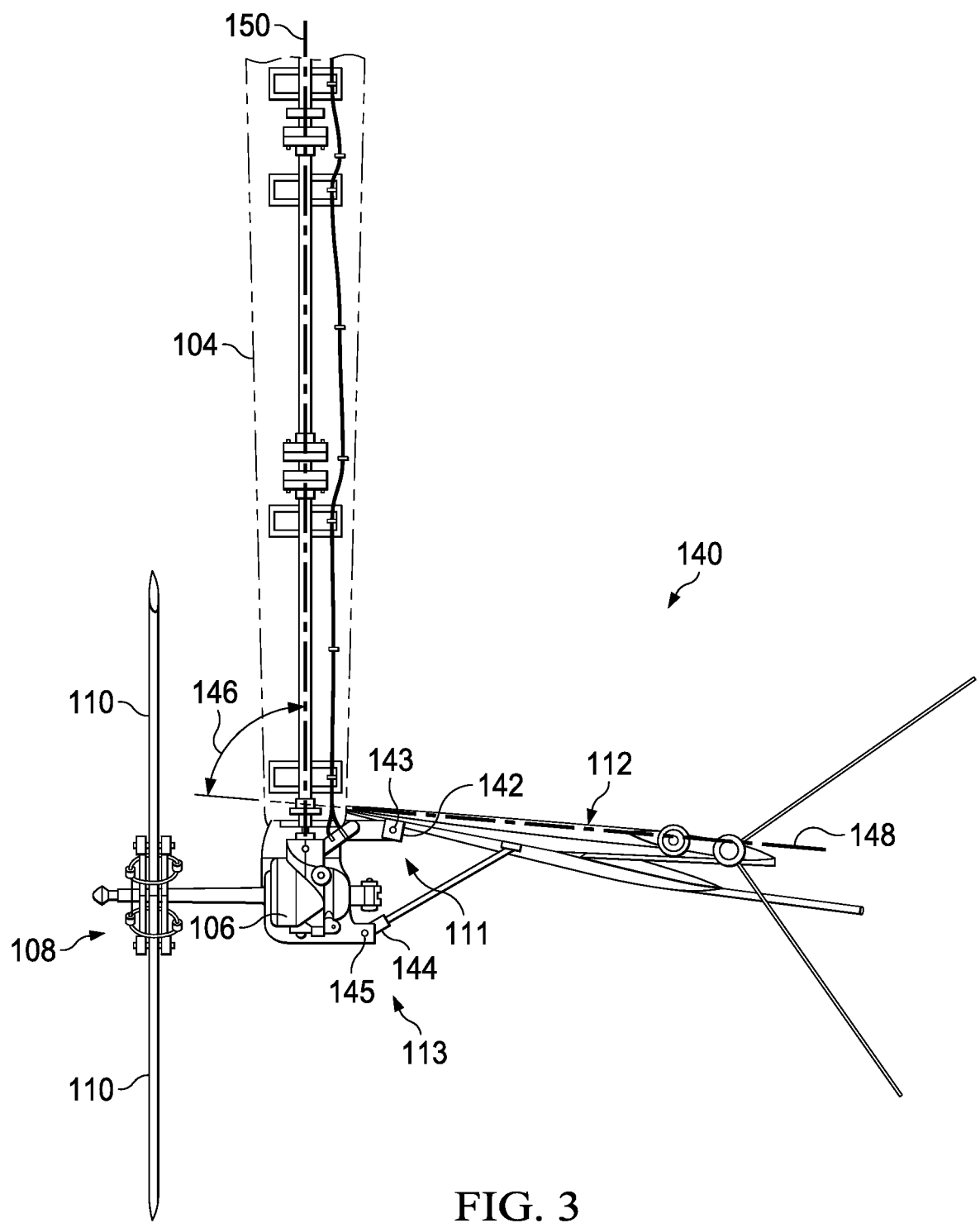
FIG. 3 is a detailed top view of the vertical stabilizer system of FIG. 2 configured in a hover or lateral movement position.

Referring to FIG. 3, a detailed top view of the vertical stabilizer system 140 of FIG. 2 is shown configured in a hover or lateral movement position. As stated, the vertical stabilizer 112 is generally selectively rotatable with respect to the tail boom 104 and/or the TRGB 106 to change the angle of attack 146. Selective actuation of the actuator 144 changes the angle of attack 146 of the entire vertical stabilizer 112. As shown, the vertical stabilizer 112 is configured in the hover or lateral movement position. In the hover or lateral movement position, the vertical stabilizer 112 may generally comprise a substantially ninety degree angle of attack 146. A substantially ninety degree angle of attack 146 occurs when the longitudinal axis 148 of the vertical stabilizer 112 is substantially perpendicular to the longitudinal axis 150 of the tail boom 104 and/or helicopter 100, which may also be coincident with the roll axis of the helicopter 100 and/or the direction of straight line forward flight of the helicopter 100. However, in other embodiments, in the hover or lateral movement position, the vertical stabilizer 112 may comprise an angle of attack 146 of at least about sixty, seventy, seventy-five, eighty, or eighty-five degrees. Further, at least in some embodiments, the vertical stabilizer 112 may comprise a hard stop that prevents the vertical stabilizer 112 from rotating beyond ninety degrees.

As shown, the vertical stabilizer 112 is selectively rotated counterclockwise from the flight position to the hover or lateral movement position and may also be selectively rotated clockwise from the hover or lateral movement position to the forward flight position. Furthermore, the angle of attack 146 utilized may be based on the operation of helicopter 100. For example, the substantially small degree angle of attack 146 may be used when the helicopter 100 is operated in high speed forward flight, while the ninety degree angle of attack 146 may be used when the helicopter 100 is operated in hover or maneuvering laterally. However, when the helicopter 100 is operated at low speed forward flight or performing other low speed maneuvers, the angle of attack 146 of the vertical stabilizer 112 may be selected to be any angle between the forward flight position and the hover or lateral position depending on the yaw stabilization demand or other requirements of the helicopter 100. In some embodiments, the vertical stabilizer 112 may be selectively rotated to any angle of attack 146 between the forward flight position and the hover or lateral position. In other embodiments, the vertical stabilizer 112 may comprise a plurality of set angles of attack 146 (e.g. zero (forward flight position), fifteen, thirty, forty-five, sixty, seventy-five, and ninety degrees (hover or lateral movement position)). Further, at least in some embodiments, the vertical stabilizer 112 may also be rotated beyond the forward flight position to achieve a negative angle of attack 146.

Traditional, fixed vertical stabilizers impede the airflow from the tail rotor, thereby reducing the efficiency of the tail rotor to provide yaw stability. However, by selectively adjusting the angle of attack 146 towards the hover or lateral movement position through rotation of the vertical stabilizer 112 about the hinge axis 143, the vertical stabilizer 112 may be oriented closer to parallel relative to the airflow imparted by the tail rotor 108, thereby significantly reducing or altogether eliminating the restriction of the airflow imparted by the tail rotor 108 when the helicopter 100 is hovering or maneuvering laterally. Accordingly, the thrust provided by the tail rotor 108 and the efficiency of the tail rotor 108 to provide yaw stability is increased.

The increased thrust and efficiency of the tail rotor 108 enabled by the selective rotation of the vertical stabilizer 112 may allow the tail rotor 108 to require tail rotor blades 110 having a shorter length. By rotating the vertical stabilizer 112 to significantly reduce or altogether eliminate the restriction of the airflow imparted by the tail rotor 108, the required diameter of the tail rotor 108 may be reduced while still producing an adequate amount of thrust. The shorter length of the tail rotor blades 110 results in reduced weight and provides design benefits such as increased clearance with the ground during a flare maneuver and with the main rotor blades 116. Additionally, while stationary, selective rotation of the vertical stabilizer 112 may allow easier maintenance access to a TRGB 106, tail rotor 108, tail rotor blades 110, or other components on the aft end of the helicopter 100.

Furthermore, rotation of the vertical stabilizer 112 towards the hover or lateral movement position may provide a "speed braking" function to the helicopter 100. If a sudden decrease in speed is desired by the helicopter 100 during a high speed forward flight condition, the vertical stabilizer 112 can be rotated to the hover or lateral movement position. At high speed, the substantially perpendicularly oriented vertical stabilizer 112 produces a large amount of forward flight resistance and drag to the helicopter 100, since it would act as a flat surface in a free stream airflow. The drag produced by the vertical stabilizer 112 would therefore provide a braking force, thereby quickly decreasing the forward flight speed of the helicopter 100.

Still further, in some embodiments, selective rotation of the vertical stabilizer 112 may provide autorotation assistance when the helicopter 100 is hovering or maneuvering laterally. An autorotation maneuver occurs when all engine(s) of an aircraft, such as helicopter 100, are unable to provide power to the drive system. In order to land safely, the helicopter 100 converts its gravitational potential energy to rotor rotational energy by descending at a predetermined descent rate (known informally as "wind-milling"). This descent rate is influenced by the efficiency of both the main rotor system 114 and the tail rotor 108. During a low speed autorotation maneuver, the vertical stabilizer 112 may be rotated towards the hover or lateral movement position to minimize blockage of the airflow imparted by the tail rotor 108, thereby improving the efficiency of the tail rotor 108 such that the required descent rate in an autorotation is reduced. This gives the pilot of the helicopter 100 more time to find a viable landing spot, which improves overall aircraft safety of the helicopter 100.

Figure 4:
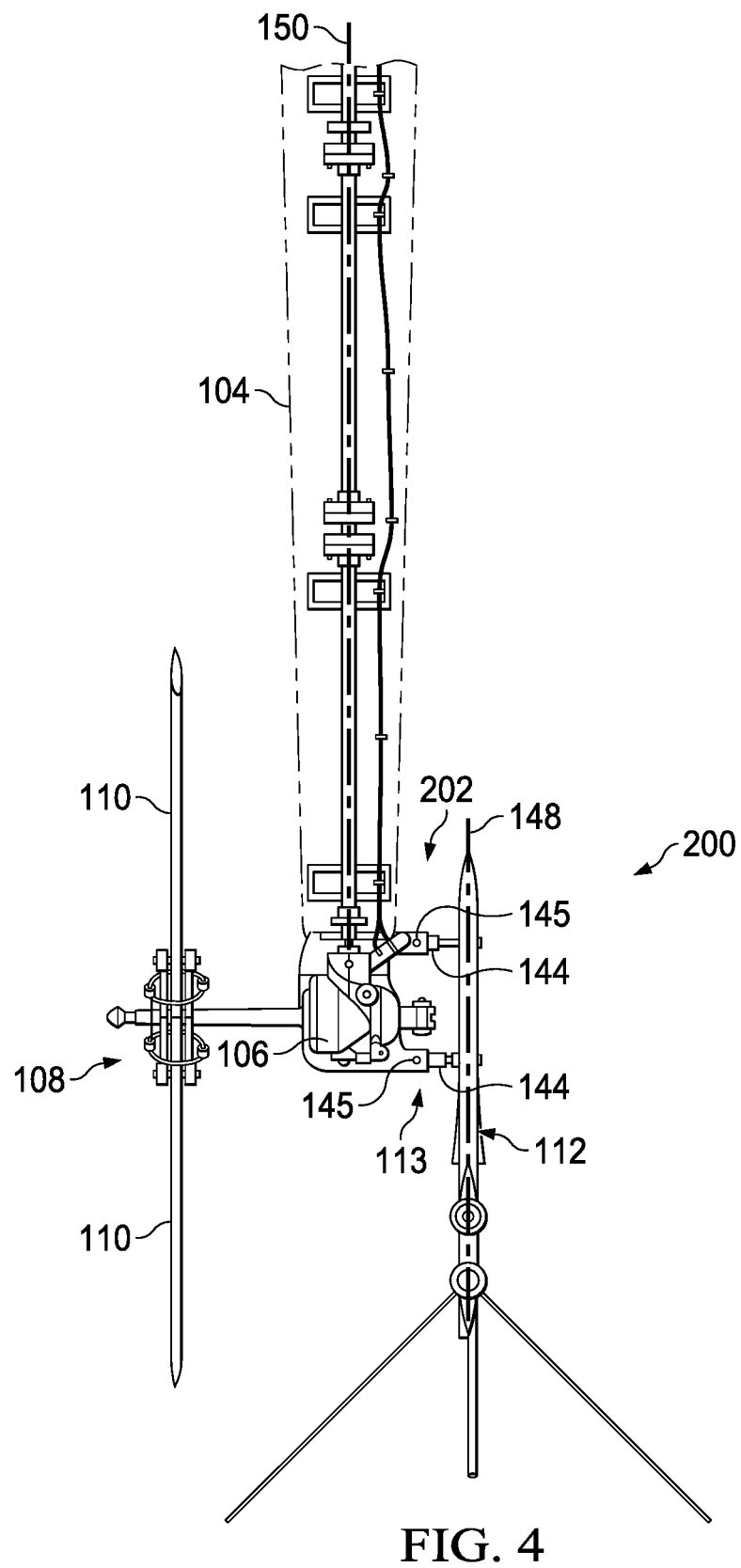
FIG. 4 is a detailed top view of another embodiment of vertical stabilizer system according to this disclosure and configured in the forward flight position.
Figure 5:
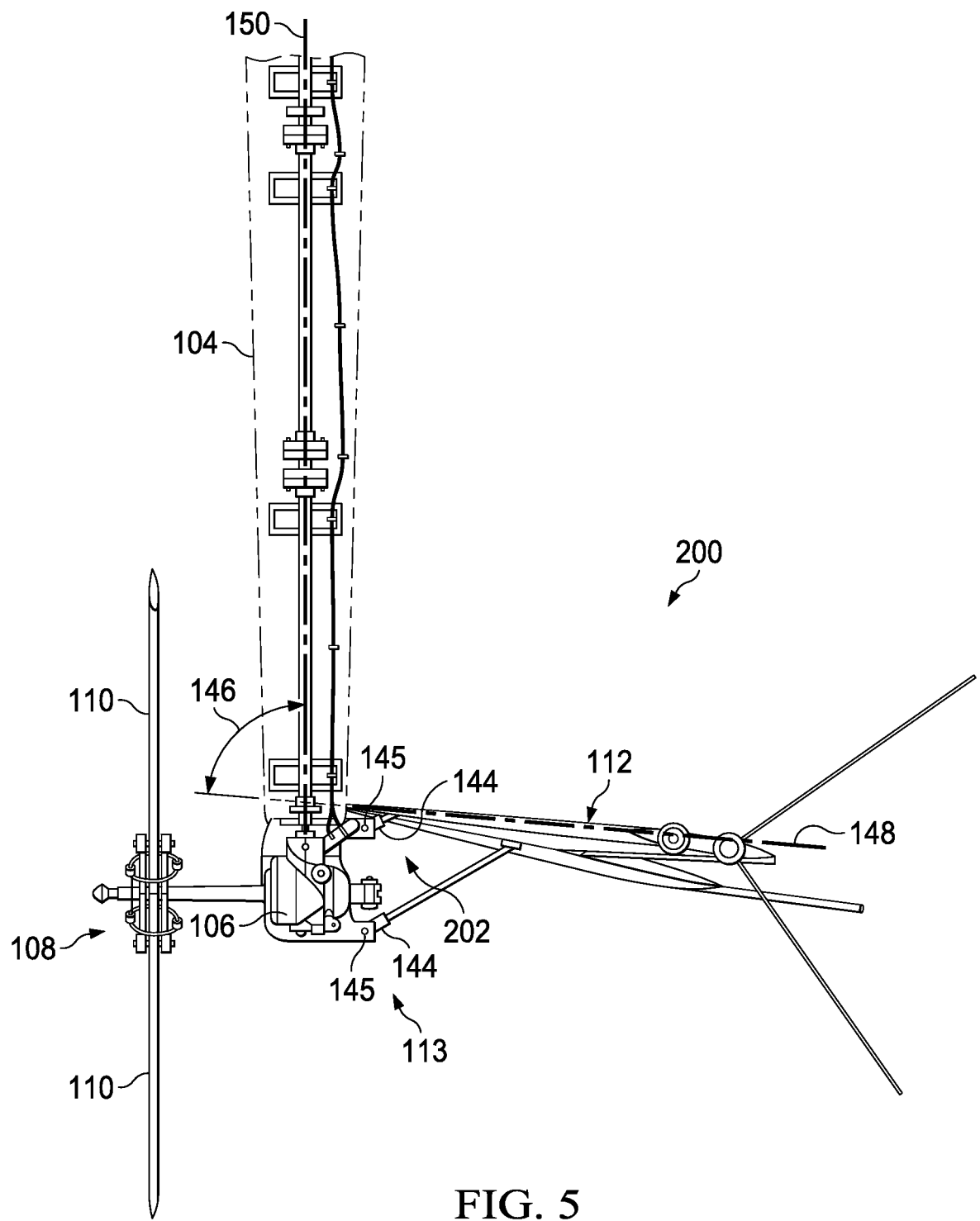
FIG. 5 is a detailed top view of the vertical stabilizer system of FIG. 4 configured in the hover or lateral movement position.

Referring to FIGS. 4 and 5, detailed top views of another embodiment of a vertical stabilizer system 200 according to this disclosure are shown configured in the forward flight position and the hover or lateral movement position, respectively. Vertical stabilizer system 200 may generally be substantially similar to and operate substantially similar to vertical stabilizer system 140. However, both the forward attachment 202 and the aft attachment 113 of the vertical stabilizer system 200 comprise at least one actuator 144. However, in some embodiments, one or more of the forward attachment 202 and the aft attachment 113 of vertical stabilizer system 200 may comprise a plurality of actuators 144. The actuators 144 are individually or simultaneously actuated (extended and retracted) to cause the vertical stabilizer 112 to rotate about an axis that is substantially parallel to a yaw axis of the helicopter 100 to selectively adjust the angle of attack 146 of the vertical stabilizer 112 between a forward flight position and a hover or lateral movement position. For example, in some embodiments, the actuator 144 of the forward attachment 202 may be selectively retracted, while the actuator 144 of the aft attachment 113 may be selectively extended to reach the hover or lateral movement position having a substantially ninety degree angle of attack 146. Additionally, the actuators 144 may each be pivotable about a pivot axis 145 to allow for articulation of the actuator 144 when the actuators 144 are selectively actuated. Selective actuation of the actuators 144 of the vertical stabilizer system 200 to adjust the angle of attack 146 may be initiated by an input received via the pilot control system 120 and/or automated via the flight control system 130 based on the operation of helicopter 100.

Figure 6:
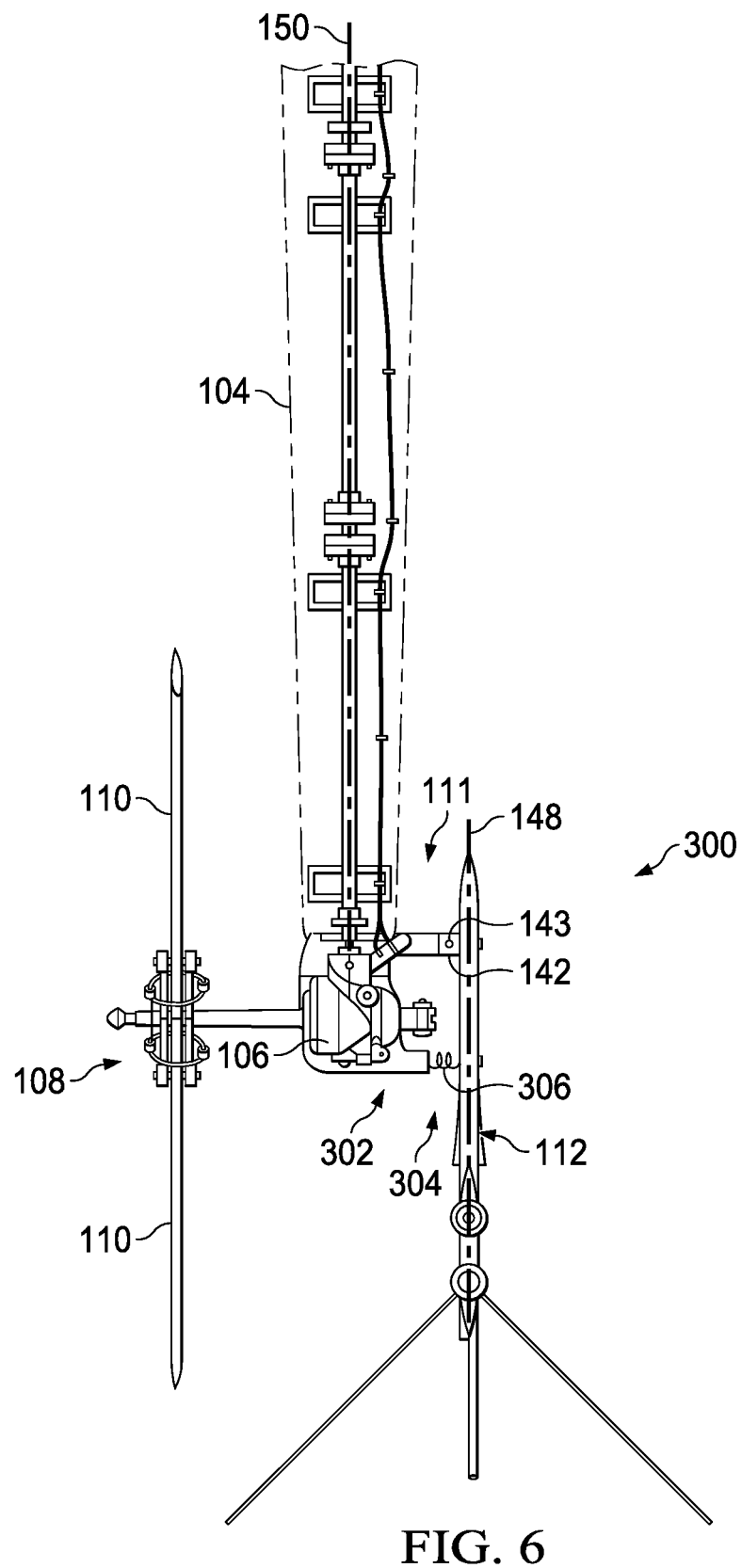
FIG. 6 is a detailed top view of yet another embodiment of vertical stabilizer system according to this disclosure.

Referring to FIG. 6, a detailed top view of yet another embodiment of vertical stabilizer system 300 according to this disclosure is shown. Vertical stabilizer system 300 may generally be substantially similar to and operate substantially similar to vertical stabilizer system 140. However, vertical stabilizer system 300 comprises a passive system that automatically adjusts the angle of attack 146 based on the operation of the helicopter 100. As opposed to the actuator 144 of vertical stabilizer systems 140, 200, the aft attachment 302 of the vertical stabilizer system 300 comprises a spring system 304. The spring system 304 generally comprises at least one spring 306 coupled between the tail boom 104 or TRGB 106 and the vertical stabilizer 112. The spring 306 may generally be tuned to the operational characteristics of the helicopter 100, such that airflow acting on the vertical stabilizer 112 during forward flight and hover or lateral movement of the helicopter 100 translates compressive or tensile forces to the spring 306.

In the embodiment shown, when the spring 306 is not subject to compressive or tensile forces, the spring 306 remains at rest, thereby configuring the vertical stabilizer 112 in the forward flight position (zero or substantially small degree angle of attack 146) where the longitudinal axis 148 of the vertical stabilizer 112 is substantially parallel to a longitudinal axis 150 of the tail boom 104 and/or helicopter 100. Tensile forces applied to the spring 306 results in a positive angle of attack 146, while in some embodiments, compressive forces applied to the spring 306 may result in a negative angle of attack 146 (shown in FIG. 5). However, in alternative embodiments, the spring 306 may configure the vertical stabilizer 112 in the hover or lateral movement position (ninety degree angle of attach 146) at rest and transition the vertical stabilizer 112 to the forward flight position upon application of a compressive force to the spring 306 caused by forward flight airflow over the vertical stabilizer 112. As forward flight speeds of helicopter 100 increase, airflow imparted by the tail rotor 108 to provide yaw stability decreases, while airflow along the longitudinal axis 148 of the vertical stabilizer 112 increases. This results in the vertical stabilizer 112 being configured with a zero or substantially small degree angle of attack 146 (forward flight position) when the helicopter 100 is operated in forward flight. However, as forward flight speeds decrease and the helicopter 100 transitions to hovering or maneuvering laterally, airflow imparted by the tail rotor 108 to provide yaw stability may increase, while airflow along the longitudinal axis 148 of the vertical stabilizer 112 decreases. The increasing airflow imparted by the tail rotor 108 causes tension in the spring 306 and consequently an increasing angle of attack 146, until the helicopter 100 reaches a hover or lateral movement operation, where the vertical stabilizer 112 is configured with a substantially ninety degree angle of attack 146 (hover or lateral movement position).

Figure 7:
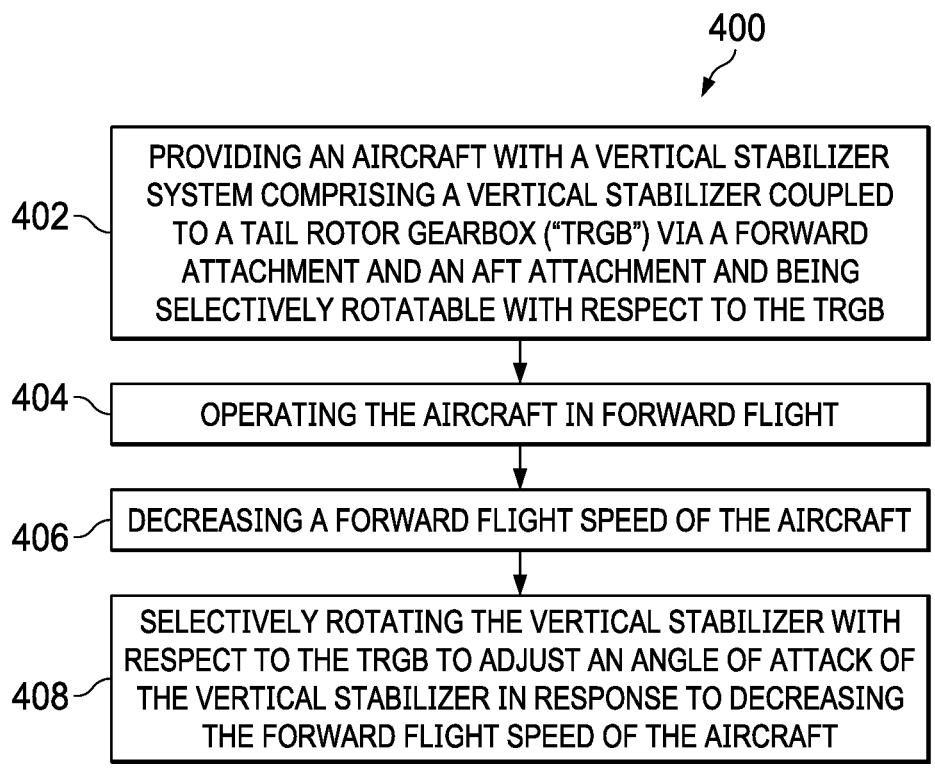
FIG. 7 is a flowchart of a method of operating an aircraft according to this disclosure.

Referring to FIG. 7, a flowchart of a method 400 of operating a helicopter 100 according to this disclosure is shown. Method 400 begins at block 402 by providing a helicopter 100 with a vertical stabilizer system 140, 200, 300 comprising a vertical stabilizer 112 coupled to at least one of a tail boom 104 and a tail rotor gearbox ("TRGB") 106 via a forward attachment 111, 202 and an aft attachment 113, 302 and being selectively rotatable with respect to the tail boom 104 and/or the TRGB 106. In some embodiments, the forward attachment 111, 202 may comprise a hinge 142 or an actuator 144. In some embodiments, the aft attachment 113, 302 may comprise an actuator 144 or a spring system 304 comprising a spring 306. In embodiments comprising the spring system 304 having spring 306, the spring 306 may be tuned to the operational characteristics of the helicopter 100. Method 400 may continue at block 404 by operating the helicopter 100 in forward flight. Method 400 may continue at block 406 by decreasing a forward flight speed of the helicopter 100. In some embodiments, the forward flight speed may be decreased until the helicopter 100 reaches a hover or is reduced enough to perform lateral maneuvers. Method 400 may conclude at block 408 by selectively rotating the vertical stabilizer 112 with respect to the tail boom 104 and/or the TRGB 106 to adjust an angle of attack 146 of the vertical stabilizer 112 in response to decreasing the forward flight speed of the helicopter 100. In some embodiments, the vertical stabilizer 112 may be selectively rotated in response to operation of at least one actuator 144 that couples the vertical stabilizer 112 to the tail boom 104 and/or TRGB 106. However, in other embodiments, the vertical stabilizer 112 may be selectively rotated in response to compression or tension of a spring 306 of a spring system 304 that couples the vertical stabilizer 112 to the tail boom 104 and/or TRGB 106 at the aft attachment 302.

Figure 8:
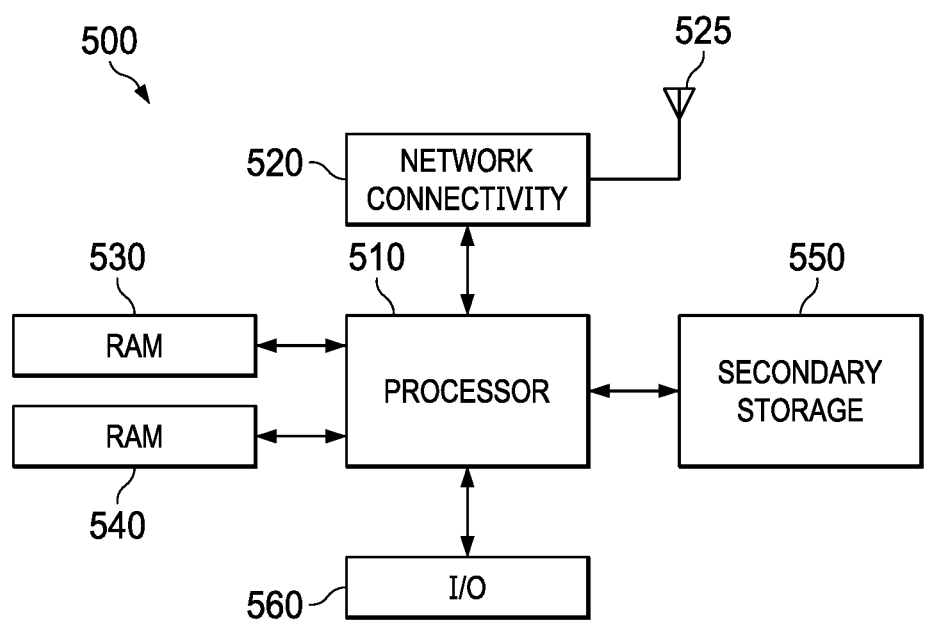
FIG. 8 is a schematic diagram of a general-purpose processor (e.g., electronic controller or computer) system suitable for implementing the embodiments of this disclosure.

Referring now to FIG. 8, a schematic diagram of a general-purpose processor (e.g. electronic controller or computer) system 500 suitable for implementing the embodiments of this disclosure is shown. System 500 that includes a processing component 510 suitable for implementing one or more embodiments disclosed herein. Particularly, the above-described pilot control system 120, the flight control system 130, and/or another control system of helicopter 100 may comprise one or more systems 500. In addition to the processor 510 (which may be referred to as a central processor unit or CPU), the system 500 might include network connectivity devices 520, random access memory (RAM) 530, read only memory (ROM) 540, secondary storage 550, and input/output (I/O) devices 560. In some cases, some of these components may not be present or may be combined in various combinations with one another or with other components not shown. These components might be located in a single physical entity or in more than one physical entity. Any actions described herein as being taken by the processor 510 might be taken by the processor 510 alone or by the processor 510 in conjunction with one or more components shown or not shown in the system 500. It will be appreciated that the data described herein can be stored in memory and/or in one or more databases.

The processor 510 executes instructions, codes, computer programs, or scripts that it might access from the network connectivity devices 520, RAM 530, ROM 540, or secondary storage 550 (which might include various disk-based systems such as hard disk, floppy disk, optical disk, or other drive). While only one processor 510 is shown, multiple processors may be present. Thus, while instructions may be discussed as being executed by processor 510, the instructions may be executed simultaneously, serially, or otherwise by one or multiple processors 510. The processor 510 may be implemented as one or more CPU chips and/or application specific integrated chips (ASICs).

The network connectivity devices 520 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 520 may enable the processor 510 to communicate with the Internet or one or more telecommunications networks or other networks from which the processor 510 might receive information or to which the processor 510 might output information.

The network connectivity devices 520 might also include one or more transceiver components 525 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 525 might include separate receiving and transmitting units or a single transceiver. Information transmitted or received by the transceiver component 525 may include data that has been processed by the processor 510 or instructions that are to be executed by processor 510. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 530 might be used to store volatile data and perhaps to store instructions that are executed by the processor 510. The ROM 540 is a non-volatile memory device that typically has a smaller memory capacity than the memory capacity of the secondary storage 550. ROM 540 might be used to store instructions and perhaps data that are read during execution of the instructions. Access to both RAM 530 and ROM 540 is typically faster than to secondary storage 550. The secondary storage 550 is typically comprised of one or more disk drives or tape drives and might be used for non-volatile storage of data or as an over-flow data storage device if RAM 530 is not large enough to hold all working data. Secondary storage 550 may be used to store programs or instructions that are loaded into RAM 530 when such programs are selected for execution or information is needed.

The I/O devices 560 may include liquid crystal displays (LCDs), touchscreen displays, keyboards, keypads, switches, dials, mice, track balls, voice recognizers, card readers, paper tape readers, printers, video monitors, transducers, sensors, or other well-known input or output devices. Also, the transceiver 525 might be considered to be a component of the I/O devices 560 instead of or in addition to being a component of the network connectivity devices 520. Some or all of the I/O devices 560 may be substantially similar to various components disclosed herein and/or may be components of the pilot control system 120, the flight control system 130, and/or other system of helicopter 100.

While shown as helicopter 100, it will be appreciated that any of the vertical stabilizer systems 140, 200, 300 may be used in any other aircraft, including but not limited to airplanes, other rotorcraft, tiltrotors, other vertical takeoff and landing ("VTOL") aircraft, and/or any "manned" or "un-manned" aircraft. Additionally, an aircraft may include one or more vertical stabilizer systems 140, 200, 300.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A tailboom system, comprising:
    a tailboom; and
    a vertical stabilizer operatively coupled to a portion of the tailboom via a forward attachment and an aft attachment, wherein the vertical stabilizer is selectively rotatable to adjust an angle of attack of the vertical stabilizer with respect to a longitudinal length direction of the tailboom;
    wherein the vertical stabilizer at least partially overlaps, along the longitudinal length direction, a rotor blade of a tail rotor system that is carried by the tailboom.

2. The tailboom system of claim 1, wherein the forward attachment comprises a hinge having a hinge axis, and wherein the vertical stabilizer is selectively rotatable about the hinge axis.

3. The tailboom system of claim 2, wherein the hinge axis is substantially parallel to a yaw axis of the tailboom.

4. The tailboom system of claim 3, wherein the aft attachment comprises at least one actuator configured to provide selective rotation of the vertical stabilizer about the hinge axis.

5. The tailboom system of claim 1, wherein each of the forward attachment and the aft attachment comprises at least one actuator configured to provide selective rotation of the vertical stabilizer.

6. The tailboom system of claim 3, wherein the aft attachment comprises a spring system comprising at least one spring.

7. The tailboom system of claim 6, wherein the spring is configured to allow selective rotation of the vertical stabilizer about the hinge axis in response to a change in forward movement of the tailboom.

8. An aircraft, comprising:
    a fuselage; and
    a tail boom extending from the fuselage; and
    a vertical stabilizer operatively coupled to the aircraft via a forward attachment and an aft attachment, wherein the vertical stabilizer is selectively rotatable with respect to the fuselage to adjust an angle of attack of the vertical stabilizer with respect to a forward flight direction of the aircraft;
    wherein the vertical stabilizer at least partially overlaps a rotor blade of a tail rotor system in a fore-aft direction.

9. The aircraft of claim 8, wherein the forward attachment comprises a hinge having a hinge axis substantially parallel to a yaw axis of the aircraft, and wherein the vertical stabilizer is selectively rotatable about the hinge axis.

10. The aircraft of claim 9, wherein the aft attachment comprises an actuator configured to provide selective rotation of the vertical stabilizer about the hinge axis.

11. The aircraft of claim 8, wherein each of the forward attachment and the aft attachment comprises at least one actuator configured to provide selective rotation of the vertical stabilizer.

12. The aircraft of claim 9, wherein the aft attachment comprises a spring system comprising at least one spring tuned to the aircraft and configured to allow selective rotation of the vertical stabilizer about the hinge axis in response to a change in forward flight speed of the aircraft.

13. The aircraft of claim 8, wherein the angle of attack is less than or equal to about five degrees when the aircraft is operated in forward flight, and wherein the angle of attack is about ninety degrees when the aircraft is hovering or maneuvering laterally.

14. The aircraft of claim 13, wherein the vertical stabilizer is configured to default to a predetermined angle of attack.

15. The aircraft of claim 14, wherein the angle of attack is controlled by at least one of (1) an input received via a pilot control system of the aircraft and (2) a flight control system of the aircraft.

16. A method of operating an aircraft, comprising:
    providing the aircraft with a vertical stabilizer coupled to the aircraft via a forward attachment and an aft attachment, wherein the vertical stabilizer is selectively rotatable with respect to the aircraft;
    operating the aircraft in forward flight in a forward flight direction at a forward flight speed;
    decreasing the forward flight speed of the aircraft; and
    selectively rotating the vertical stabilizer to adjust an angle of attack of the vertical stabilizer with respect to the forward flight direction of the aircraft in response to decreasing the forward flight speed of the aircraft;
    wherein the vertical stabilizer at least partially overlaps a rotor blade of a tail rotor system in a fore-aft direction.

17. The method of claim 16, wherein the selectively rotating the vertical stabilizer is accomplished via selective operation of at least one actuator at the aft attachment.

18. The method of claim 16, wherein the selectively rotating the vertical stabilizer is accomplished via at least one of tensile force and a compressive force to a spring at the aft attachment.

19. The method of claim 16, wherein the angle of attack is less than or equal to about five degrees when the aircraft is operated in forward flight at the forward flight speed, and wherein the angle of attack adjusted to substantially ninety degrees when the forward flight speed is decreased below a predetermined speed.

* * * * *